(No Model.)
J. J. HERBERT.
WATER AND WASTE PIPE.
No. 304,930. Patented Sept. 9, 1884.
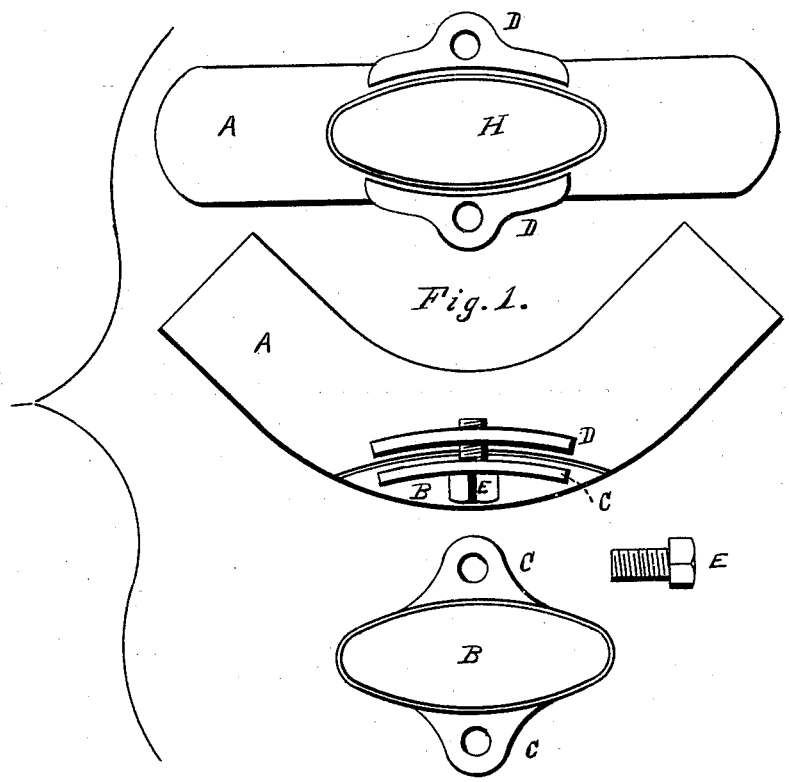
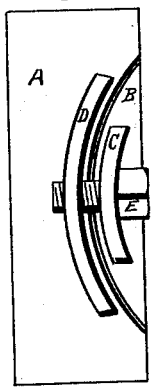
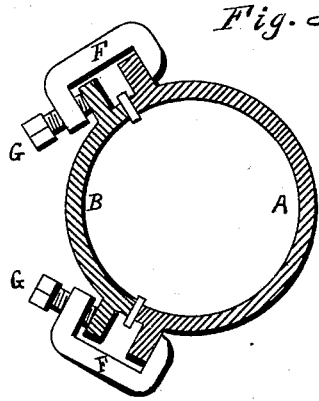
Witnesses—
Inventor—
John J. Herbert,
By H. K. Hawes,
Attorney.

UNITED STATES PATENT OFFICE.

JOHN J. HERBERT, OF HOLYOKE, MASSACHUSETTS.

WATER AND WASTE PIPE.

SPECIFICATION forming part of Letters Patent No. 304,930, dated September 9, 1884.

Application filed September 20, 1883. (No model.)

*To all whom it may concern:*

Be it known that I, JOHN J. HERBERT, a citizen of the United States, residing at Holyoke, in the county of Hampden and Commonwealth of Massachusetts, have invented a new and useful Improvement in Water and Waste Pipes, of which the following is a specification, reference being had to the accompanying drawings, forming a part thereof.

The object of my invention is to facilitate the cleaning of water and waste pipes and obviate the necessity of cutting such pipes or the parts of the buildings with which they are connected when cleaning them. I attain this object by the construction and mechanism illustrated in the accompanying drawings, in which—

Figure 1 is a side view of an elbow-joint with my invention attached. Fig. 2 is a side view of a water-pipe, showing my invention attached. Fig. 3 is a cross-section of a pipe with my invention attached.

Similar letters of reference indicate corresponding parts.

A in Fig. 1 is an elbow-joint, having an aperture, H, usually made in the center thereof, over which is placed the cap or plate of my invention, and which is to be made of the same material as the pipe upon which it is to be used. B is the plate or cap, having ears C upon each side thereof. Corresponding ears, D, are formed upon the sides of the elbow-joint A. Set-screws E, entering suitable holes in said ears, secure the parts in position. Between the edge of the cap or plate and the edge around the aperture is to be placed suitable packing.

In Fig. 2, A is a straight pipe. B is the cap or plate, secured in position by set-screw E passing through ears C and D, in the same manner as described as to Fig. 1.

My invention may be applied to straight or curved pipe of any material.

Fig. 3 is a cross-section of a pipe and the cap or plate, showing the method of applying my invention where the pipe is composed of cement or such other material as does not admit of having the set-screws pass through it. Suitable ears formed on the pipe and cap are drawn together by the clamps F by means of the set-screws G.

Having thus described my invention, what I claim as new, and desire to secure by Letters Patent, is—

In a drain and waste pipe having an elongated aperture in its side, and provided with rectangular face-flanges C D near the edge thereof, the plate B, of similar contour to the said aperture, adapted to engage the edge walls of the aperture with an interposed packing, the said plate having rectangular ears or flanges C, whereby the same may be connected to the flanges of the pipe-aperture by means substantially as shown and described.

JOHN J. HERBERT.

Witnesses:
S. Q. A. HAWES,
A. B. GRIMES.